J. B. MONROE.
Hand-Sled.

No. 160,837. Patented March 16, 1875.

WITNESSES.

INVENTOR.
Jas. B. Monroe
per
F. A. Lehmann, Atty.

UNITED STATES PATENT OFFICE

JAMES B. MONROE, OF NEWBURG, NEW YORK.

IMPROVEMENT IN HAND-SLEDS.

Specification forming part of Letters Patent No. 160,837, dated March 16, 1875; application filed September 3, 1874.

*To all whom it may concern:*

Be it known that I, JAMES B. MONROE, of Newburg, in the county of Orange and State of New York, have invented certain new and useful Improvements in Hand-Sleighs; and I do hereby declare the following to be a full, clear, and exact description of the invention, such as will enable others skilled in the art to which it pertains to make and use it, reference being had to the accompanying drawings, which form part of this specification.

My invention relates to an improvement in hand-sleds; and it consists in the arrangement and combination of parts, which will be more fully described hereafter.

The accompanying drawings represent my invention.

Figure 1:
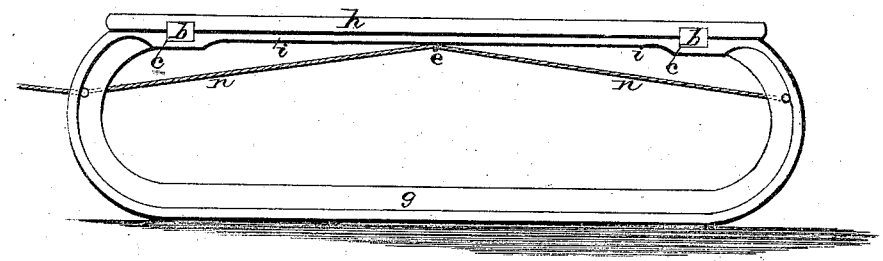
Figure 2:
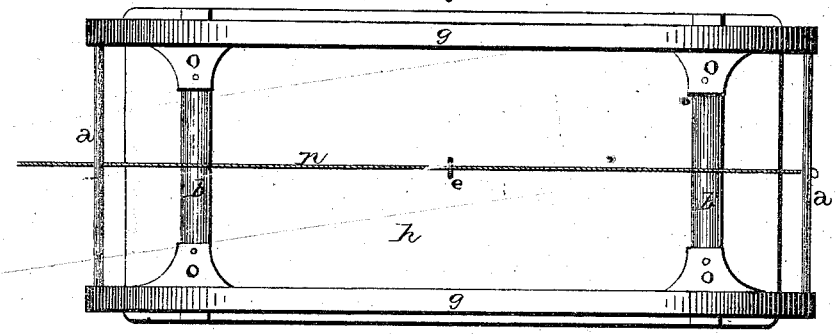
Figure 3:
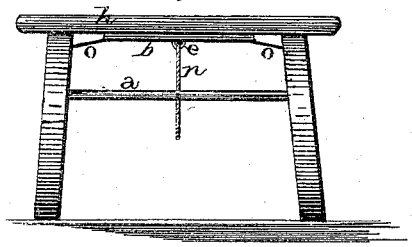
Figure 4:
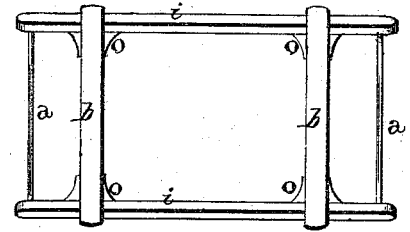
Figure 5:

$g$ represent the runners, made of iron, steel, or wood, having each end curved upward alike, so that the sled will be a double-ender, and having formed with them, in a single piece, the seat-supports $i$. The runners are secured rigidly together at each end by the iron bars $a$, and by the wooden or iron cross-bars $b$, there being a support, $o$, extending from each end of the two runners to receive the ends of the bars, and a recess, $c$, across the tops of the supports and runners, in which the ends of the bars are held. The bottoms of the runners are made wide and flat, or oval, while their upper edges taper to a sharp edge, as shown in Figure 5. To the under-side of the seat-board $h$, in its center, is secured a ring, staple, or other device, $e$, through which and the two bars $a$ passes the rope $n$, the rope being knotted at each end so that the ends cannot be drawn through the bars. By this arrangement of parts both ends of the cord or rope can be used alike; and as the sled is a double-ender it is never necessary to reverse the ends or to attach the rope anew at the other end, but is always ready to be used just as it stands.

I am aware that double-ended runners are old, and I do not, therefore, claim them.

My invention consists in the double-ended runners having the supports $i$ formed with them, and then secured together by the cross-bars $a$ $b$.

Having thus described my invention, I claim—

1. The double-ended runners $g$, formed in one piece with the supports $i$, in combination with the cross-bars $a$ $b$ and seat-board $h$, substantially as set forth.

2. A hand-sled having the double-ended runners $g$, perforated bars $a$, seat-board $h$, eye or staple $e$, and rope $n$, all combined substantially as shown and described.

In testimony that I claim the foregoing I have hereunto set my hand this 28th day of August, 1874.

JAMES B. MONROE.

Witnesses:
 JOSHUA R. BUXTON,
 WILLIAM C. GIBB.